Figures 1, 2, 3, 4:
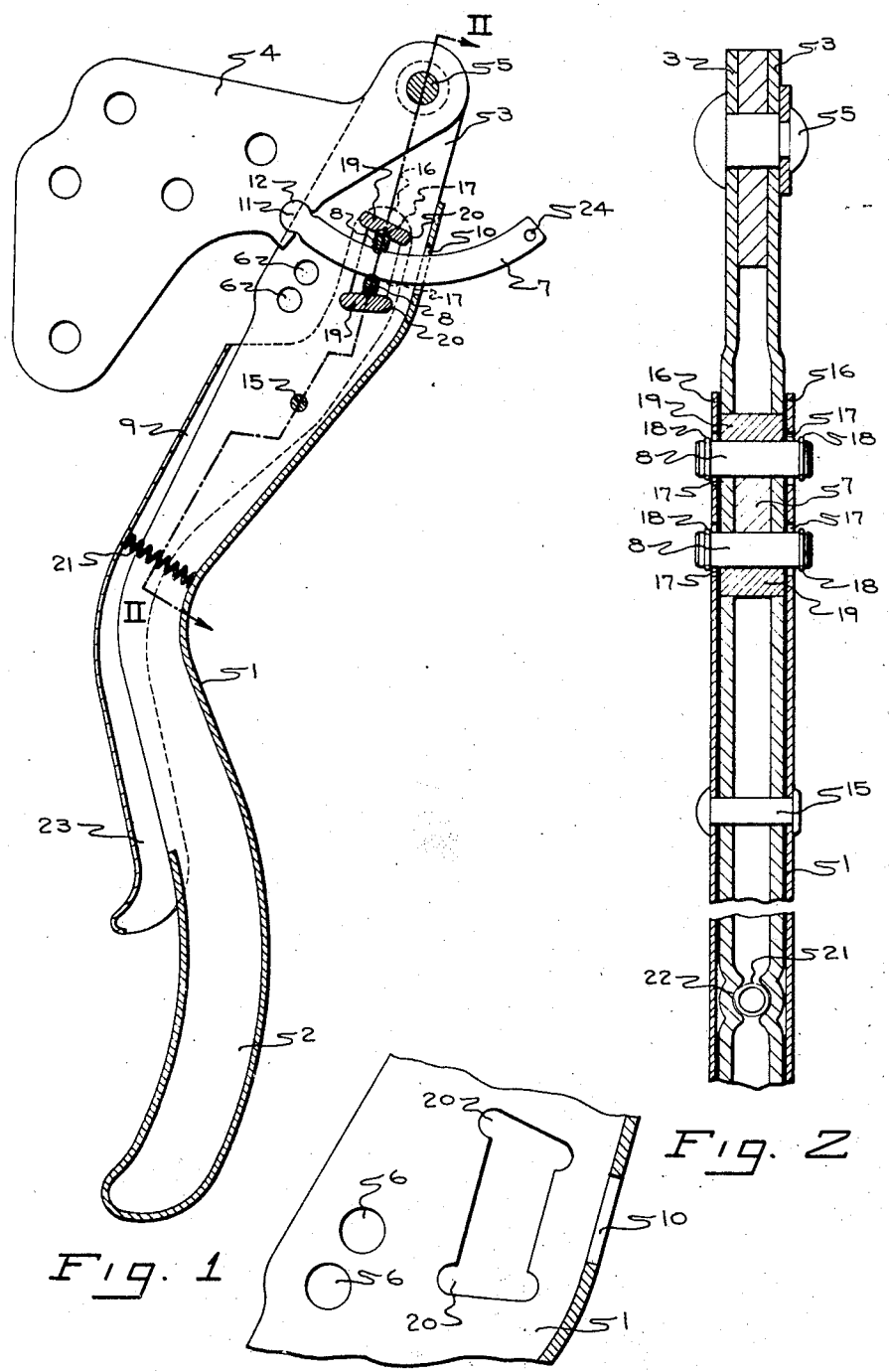

Nov. 19, 1940.     S. A. SNELL     2,222,492
BRAKE LEVER
Filed April 7, 1939

Inventor
SAMUEL A. SNELL
By Beaman + Langford
Attorney

Patented Nov. 19, 1940

2,222,492

UNITED STATES PATENT OFFICE 2,222,492

BRAKE LEVER

Samuel A. Snell, Jackson, Mich., assignor to Townsend F. Beaman, trustee, Jackson, Mich.

Application April 7, 1939, Serial No. 266,450

9 Claims. (Cl. 74—531)

This invention relates to hand brake levers and more particularly to the type that project from beneath the dash of automotive vehicles.

Broadly, the objects and advantages of the present invention reside in the simplified arrangement and construction of the parts. To this end, the brake lever is locked in its adjusted position by a frictionally gripping structure, the locking member of which are carried by a releasing trigger disposed entirely on one side of the lever and arranged to be tripped by exerting a force on the manually engageable end thereof in the direction of moving the brake lever to set the brake, that is, by a pulling action. The fabrication of the structure comprising the present invention is further simplified by providing all hard, wear resisting portions as separate pieces rather than as portions of a larger piece.

More particularly, an object of the invention is to provide a brake lever having a releasing trigger pivoted to and disposed entirely on one side of the lever.

Another object of the invention is to provide a brake lever lockable in adjusted position by a frictionally gripping member carried by a releasing trigger.

A further object of the invention is to provide a brake lever lockable in adjusted position by frictionally gripping movable members, swingable with the lever, bearing against a locking segment on one side thereof and against hardened inserts in the lever on the other side thereof.

These and other objects will be apparent from the following specification when taken with the accompanying drawing, in which Fig. 1 is a vertical section through a lever and releasing trigger structure comprising the present invention, Fig. 2 is a section of the line II—II of Fig. 1, Fig. 3 is a detail of a portion of the lever construction disclosing the cutout portions therein for receiving the roller backing plate inserts for the locking rollers, and Fig. 4 is a perspective view of a roller backing plate insert.

Referring to the drawing, the reference character 1 indicates a brake lever having a hand gripping portion 2. The hand gripping portion 2 is tubular in form arranged to comfortably fit in the hand of a user. The remainder of the brake lever 1 is channel shaped in cross section as appears particularly in Fig. 2. Extending from the upper end of the lever 1 are spaced ears 3 between which are received an attachment plate 4, adapted to be secured to the body on which the brake lever is used. A shoulder rivet 5 is passed through the ears 3 and the attachment plate 4 for pivotally connecting the lever 1 to the plate 4.

The lever 1 is connected to the brake mechanism which it actuates through suitable connections attached to one of the openings 6 therein. It will be understood that the openings 6 pass through both flanges on the channel shaped lever 1. The lever 1 is locked in its adjusted position by frictionally gripping structure comprising a locking segment 7, arcuate in form, pivotally connected to the attachment plate 4, and locking rollers 8 pivotally and loosely supported in a releasing trigger 9.

The locking segment 7 projects through an opening 10 in the web portion of the channel shaped lever 1 as shown particularly in Fig. 1, and has one end thereof shaped into a disc-like portion 11 mounted in a socket 12 in the attachment plate 4, to provide a pivotal connection between the two parts.

The releasing trigger 9 is channel shaped in cross section as shown particularly in Figs. 1 and 2, and is pivoted by means of a pin 15 in straddling relation to the lever 1. The upper end of the trigger 9 is provided with upwardly projecting ears 16 provided with slightly elongated slots 17 in which are loosely disposed for rotation the locking rollers 8. The ends of the locking rollers 8 project outwardly from the sides of the trigger 9 and are held in position in the slots 17 by locking rings 18. As shown particularly in Fig. 1 the width of the slots 17 is greater than the diameter of the locking rollers 8, only by an amount to provide clearance so that the locking rings 18 bear against the outside of the ears 16, to maintain the locking rollers 8 in position. As will be clear from the drawing, the locking segment 7 projects between the locking rollers 8.

In order to guide and resist the thrust of the locking rollers 8 is frictional engagement with the locking segment 7 for locking the lever 1 in adjusted position, backing or stop plates 19 are provided, secured to the lever 1 and arranged on the opposite sides of the locking rollers 8 from the locking segment 7. The stop plates 19 extend transversely of the lever 1 and trigger 9 and are inclined slightly toward each other at such an angle, well known in the art, that the locking rollers 8 will become wedged between the locking segment 7 and the stop plates 19, to lock the lever 1 with respect to the locking segment 7 when the lever 1 and segment 7 are moved in relative directions to cause the rollers 8 to be directed into the tapering space defined by the locking segment 7 and the stop plates 19.

The stop plates 19 are shown more particularly in Fig. 4 and comprise hard, ground appropriately shaped pieces of steel press-fitted in slots 20 in side flanges of the channel shaped lever 1. As shown particularly in Fig. 2 the stop plates 19 extend from one side of the lever 1 to the other and are arranged in parallel relation to the locking rollers 8. One of the particular advantages of the invention resides in the fact that the stop plates 19, the locking rollers 8 and the locking segment 7, comprising those parts of the invention required to be hardened, are relatively small and separate pieces which may be fabricated and hardened independently. Preferably the segment 7 is case hardened.

The trigger 9 pivoted about the pin 15 is urged in a clockwise direction about the pin 15 with respect to the lever 1, by a spring 21, at one end engaging the trigger 9 and at the other end engaging the lever 1. As shown particularly in the lower portion of Fig. 2 the side flanges of the lever 1 adjacent the section thereof, at which is desirable to locate the spring 21, are crimped to provide an open-sided chamber 22 for maintaining the spring 21 against displacement.

The structure comprising the present invention is arranged to operate and set a brake by swinging the lever 1 in a counterclockwise direction about the rivet 5 as viewed in Fig. 1. Return or clockwise movement of the lever 1 is prevented by the rollers 8 supported by the trigger 9 being jammed between the clutching surfaces of the parts 7 and 19 by the spring 21. In order to release the brake it is merely necessary to grasp the hand portion 2 of the lever 1 and with one or more fingers of the hand, engage the hand portion 23 of the releasing trigger 9. Then by pulling gently on the hand portions 2 and 23 the trigger 9 is moved in a counterclockwise direction about the pin 15 to move the locking rollers 8 out of locking relation with the locking segment 7. The lever 1 then may move in a clockwise direction to release the brake (not shown). It will be understood that while the rollers have been disclosed as the locking agents suitably guided balls could be employed in their stead. Accordingly, it is to be considered that the term roller in the specification and claims may be taken as broad enough to imply a ball as well as the cylindrical element shown in the drawing. Also an arrangement could be devised within the scope of the present invention wherein only one roller would be needed. While the brake and braking mechanism will prevent counterclockwise movement of the lever 1 about the rivet 5 to such an extent as to move the lever 1 out of operative relation with the segment 7, the outer end of the segment 7 is provided with a transverse pin 24 as a precautionary measure.

From the foregoing description it will be apparent that while the present invention has been stated to be particularly adaptable for automotive vehicles, it will be readily understood that it may have other applications. Furthermore, the certain details of the invention which have been described as being particularly useful are not considered to be limiting features in the invention. For instance, the stop plates 19 need not necessarily be formed as separate inserts or need not be associated with the structure in the specific manner described. Also the locking segment, instead of being pivotally supported, may be rigidly supported. Other changes in form may also be made.

Where the angle between the operating surfaces of the inserts or stop plates 19 is approximately 22° there is no necessity, as heretofore described, of taking the load upon the lever 1 by slightly pivoting the same counterclockwise at the time the trigger 9 is depressed. With this approximate angle, the rollers 8 may be rolled out of locking position by merely depressing the trigger 9, and then releasing the brake by pivoting the lever 1 clockwise without the objection of having to first further apply the brake before release. As the angle between the inserts or stop plates 19 is reduced, the pressure required to release the rollers 8 through the trigger 9 increases to a point at which it becomes necessary to first remove the load from the rollers 8 before depressing the trigger 9.

Having thus described my invention, what I desire to secure by Letters Patent and claim is:

1. In a device of the character described, a lever adapted to be pivoted to a suitable support, a locking segment having a clutching surface, relatively fixed with respect to said lever, a clutching surface carried by said lever and inclined to said first named clutching surface, a trigger pivoted to said lever, and a roller pivoted in and carried by said trigger and adapted to be jammed between said clutching surfaces under predetermined conditions, to lock the same together, said trigger being operative to shift said roller out of jamming engagement with said clutching surfaces to release said lever.

2. In a device of the character described, a lever adapted to be pivoted to a suitable support, a locking member having a clutching surface, relatively fixed with respect to said lever, a clutching surface carried by said lever and inclined to said first named clutching surface, a trigger pivoted to said lever, a roller pivoted in and carried by said trigger and adapted to be jammed between said clutching surfaces, resilient means pivoting said trigger with respect to said lever to urge said roller into jamming relation with said clutching surfaces, to lock the same together, said trigger being operative to shift said roller out of jamming engagement with said clutching surfaces to release said lever.

3. In a device of the character described, a lever adapted to be pivoted to a suitable support, a locking segment having a clutching surface, relatively fixed with respect to said lever, a clutching surface carried by said lever and inclined to said first named clutching surface, a trigger pivoted to said lever, a roller carried by said trigger and adapted to be jammed between said clutching surfaces to lock the same together, said trigger being operative to shift said roller out of jamming engagement with said clutching surfaces to release said lever, said trigger comprising an elongated sheet metal member of channel shaped cross section in which the ends of said roller are carried, straddling a portion of said lever, and resilient means disposed between predetermined portions of said lever and said trigger for pivoting said trigger with respect to said lever to cause said trigger to move said roller into jamming relation with said clutching surfaces.

4. In a device of the character described, a lever adapted to be pivoted to a suitable support, a locking segment having a pair of clutching surfaces, relatively fixed with respect to said lever, a pair of clutching surfaces carried by said lever, each inclined to said first named clutching surfaces respectively, a trigger pivoted to said lever, a pair of rollers carried by said trigger and adapted to be jammed between said clutching surfaces respectively under predetermined conditions to lock the same together, said locking segment being pivotable about a fixed point, said trigger being operative to shift said rollers out of jamming engagement with said clutching surfaces to release said lever.

5. In a device of the character described, a lever adapted to be pivoted to a suitable support, a locking segment having a clutching surface, relatively fixed with respect to said lever, a stop plate having a clutching surface, said stop plate being removably secured to said lever, a trigger pivoted to said lever, said trigger having spaced ears on opposite sides of said clutching surfaces, and a roller rotatably supported by said ears, and adapted to be jammed between said clutching surfaces under predetermined conditions to lock the same together, and resilient means to pivot said trigger with respect to said lever, to carry said roller into jamming relation with said clutching surfaces, said trigger being operative to shift said roller out of jamming engagement with said clutching surfaces to release said lever.

6. In a device of the character described, a lever adapted to be pivoted to a suitable support, said lever comprising an elongated member having a portion thereof of sheet metal construction and of channel shaped cross section, said channel shaped portion of said lever having an opening through the web portion thereof, a locking segment relatively fixed with respect to said lever having opposed clutching surfaces, said locking segment projecting through said opening, a pair of stop plates carried by the flange portions of said channel shaped portion of said lever, said stop plates being disposed on opposite sides of said locking segment and having clutching surfaces thereon inclined toward said locking segment clutching surfaces, a trigger pivoted to said lever, said trigger having spaced ears disposed on the opposite sides of said lever opposite said stop plates, a pair of rollers rotatably mounted between said ears and adapted to be jammed between said clutching surfaces respectively to lock the same together, and resilient means operatively associated with said lever and trigger to pivot said trigger with respect to said lever to jam said rollers between said clutching surfaces respectively, said trigger being operative to shift said rollers out of jamming engagement with said clutching surfaces to release said lever.

7. The invention as defined in claim 6 wherein the trigger comprises an elongated sheet metal member of channel shaped cross section, straddling one side of said lever, and said resilient means comprises a spring disposed between said trigger and said lever at a predetermined position.

8. A pivoted brake lever comprising a sheet metal body having spaced sides, radially spaced opposed openings in said sides, wear resisting inserts supported in said openings to present radially spaced clutching surfaces, a relatively fixed locking member extending between said sides and between said inserts and presenting opposed wear resisting surfaces in spaced relation to said first surface, a pair of rollers located between said opposed surfaces for clutching the same to one another, and releasing means connected to said rollers for moving the same along said surfaces to a declutching position.

9. A pivoted brake lever of sheet metal construction, comprising a sheet metal lever portion having radially spaced openings therein, wear resisting inserts supported in said openings to present radially spaced clutching surfaces, a locking member extending between said inserts and presenting opposed wear resisting surfaces in spaced relation to said first surfaces, a pair of rollers located between said surfaces for clutching the same to one another, and releasing means connected to said rollers for moving the same along said surfaces to a declutching position.

SAMUEL A. SNELL.